United States Patent
Arseniev

(10) Patent No.: US 9,467,525 B2
(45) Date of Patent: Oct. 11, 2016

(54) SHARED CLIENT CACHING

(71) Applicant: Alexey Arseniev, Hockenheim (DE)

(72) Inventor: Alexey Arseniev, Hockenheim (DE)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 13/788,250

(22) Filed: Mar. 7, 2013

(65) Prior Publication Data

US 2014/0258439 A1 Sep. 11, 2014

(51) Int. Cl.
*H04L 29/08* (2006.01)

(52) U.S. Cl.
CPC ............ *H04L 67/2842* (2013.01); *H04L 67/16* (2013.01)

(58) Field of Classification Search
CPC ........... H04L 67/2842; H04L 67/1095; H04L 67/2847; H04L 67/104; H04L 67/288; H04L 29/12047; H04L 63/126; H04L 29/12113; H04L 45/00; H04L 45/124; H04L 45/125; H04L 67/1076; H04L 67/28; H04L 63/1408; H04L 63/10; H04L 67/16; H04L 63/0227; H04L 63/145; H04L 67/1093; H04L 67/06; H04L 67/1021; H04L 67/1068; H04L 2209/76; G06F 17/30902; G06F 2221/0784; G06F 12/0815; G06F 17/30067

See application file for complete search history.

(56) References Cited

U.S. PATENT DOCUMENTS

| | | | |
|---|---|---|---|
| 7,174,326 B2 | 2/2007 | Ireland et al. | |
| 7,418,560 B2 | 8/2008 | Wintergerst | |
| 7,558,822 B2 | 7/2009 | Fredricksen et al. | |
| 7,584,261 B1* | 9/2009 | Teodosiu | G06F 8/60 709/217 |
| 7,590,803 B2 | 9/2009 | Wintergerst | |
| 8,001,322 B2 | 8/2011 | LeComte et al. | |
| 8,051,145 B2* | 11/2011 | Wu | H04L 65/608 709/201 |
| 8,407,448 B1 | 3/2013 | Hayden et al. | |
| 8,438,238 B2 | 5/2013 | Moser et al. | |
| 8,489,671 B2 | 7/2013 | Lepeska | |
| 8,707,429 B2 | 4/2014 | Wilbourn et al. | |
| 2003/0217140 A1* | 11/2003 | Burbeck | H04L 29/12009 709/224 |
| 2004/0044740 A1* | 3/2004 | Cudd | G06F 17/30902 709/217 |
| 2004/0088646 A1* | 5/2004 | Yeager | H04L 29/06 715/229 |
| 2006/0143389 A1 | 6/2006 | Kilian et al. | |
| 2008/0082662 A1* | 4/2008 | Dandliker | H04L 63/10 709/225 |
| 2009/0168795 A1* | 7/2009 | Segel | H04L 67/104 370/429 |
| 2009/0249214 A1 | 10/2009 | Best et al. | |
| 2010/0017600 A1* | 1/2010 | Lepeska | H04L 67/06 713/163 |
| 2010/0058405 A1* | 3/2010 | Ramakrishnan | H04N 7/17318 725/97 |
| 2011/0087733 A1* | 4/2011 | Shribman | H04L 41/046 709/204 |
| 2011/0131341 A1* | 6/2011 | Yoo | G06F 17/30902 709/237 |
| 2011/0238828 A1* | 9/2011 | Grigsby | H04L 67/104 709/224 |
| 2012/0158733 A1* | 6/2012 | McGill | G06Q 10/10 707/741 |
| 2013/0173860 A1 | 7/2013 | Comparan et al. | |
| 2014/0201457 A1* | 7/2014 | Sinai | G06F 12/121 711/135 |

\* cited by examiner

*Primary Examiner* — Kevin Bates
*Assistant Examiner* — Ranjan Pant
(74) *Attorney, Agent, or Firm* — Buckley, Maschoff & Talwalkar LLC

(57) ABSTRACT

According to some embodiments, a method and apparatus are provided to determine if a requested resource is cached at a first client or at a server based on a received list. In a case that the requested resource is determined to be cached at the first client, a request is sent to the first client for the cached resource. Else, a request is sent to the server for the cached resource. The cached resource is received.

20 Claims, 6 Drawing Sheets

SHARED CLIENT CACHING

BACKGROUND

In a client-server architecture, each client may use a communication channel to communicate with a server as well as use the same communication channel to retrieve data from the server. In many business scenarios, when a resource is read from the server by a client, the resource is saved locally at the client for the exclusive use of the client.

When the client sends a request to the server for a specific resource, the request is received at the server and the server sends a response to the requesting client that contains a copy of the resource. However, if a particular resource is requested by a plurality of clients, each client will send its own request to the server and thus a plurality of responses will be sent to the plurality of clients. These responses can place a substantial load on the server as well as cause significant network traffic that may result in multiple packet collisions on a network segment associated with the server. Placing a load on the server and increasing network traffic may cause excessive delays in receiving a response when the client requests a resource.

DETAILED DESCRIPTION

The present embodiments relate to a method, system and apparatus to share cached server resources between a first client and a second client. In particular, the first client and the second client may be on a first network segment while a server that stores a desired resource may reside on a second network segment. Cached resources may comprise, but are not limited to, a web page, an image file, a sound file, a video file, a document file, or any other type of data (or a portion of data) which may be used by a processor and/or stored on a computer. Cached resources may be stored in a cache which transparently stores resources so that future requests for a resource can be served in a shorter period of time.

In some cases, resources may be private (e.g., personalized or restricted to a particular group of individuals) or encrypted. In this situation, exclusive access to these resources may be acceptable because these resources cannot be shared. However, when clients access shared (e.g., non-private) resources from the server, it may be beneficial if the resources are accessed not from server directly, but from a neighboring client which has previously accessed (e.g., read or downloaded) the same resource. In some embodiments, accessing resources from a neighboring client may reduce network traffic by reducing traffic between the server and clients, reduce server load, and increase a client's speed of data retrieval because local networks segments are typically faster than server network segments since they are not as loaded (e.g., less collisions).

Furthermore, if multiple clients have cached a same resource, that same resource may be downloaded in parallel from neighboring clients. Also, by retrieving cached information from neighboring clients, no additional hardware, such as additional proxy servers or caching on communication hardware, is necessary for caching the resources.

Figure 1:
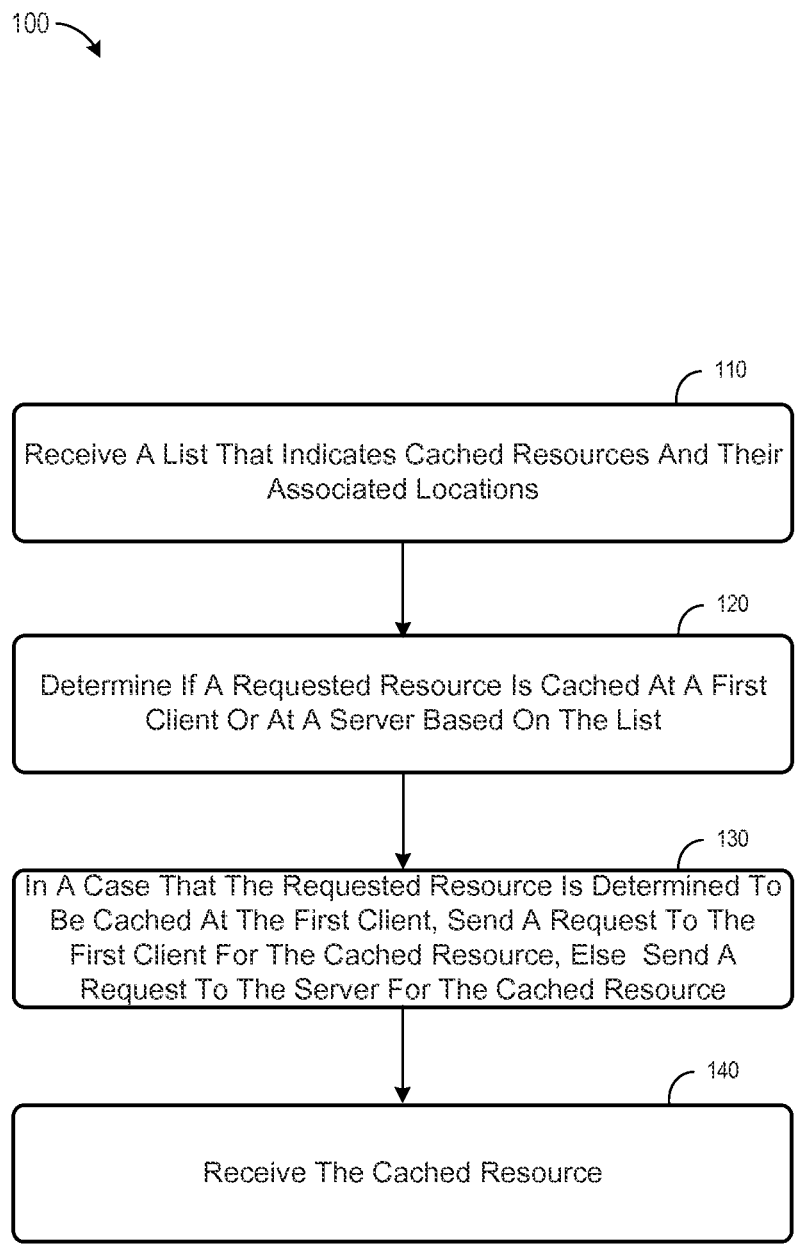
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 6. The method 100 may be associated with sharing cached resources between clients and, in some embodiments, may be from a perspective of a dispatcher module. In the present embodiments, a client may comprise a computing device having a significant function of interfacing with end users and running client software. A server, unlike a client, may have a main function of being accessed by clients. A client may be considered a non-server.

At 110, a list that indicates cached resources and their associated locations is received. The list may be sent from a client or from a server. At 120, a determination is made if a requested resource is cached at a first client or at a server based on the received list. The determination may be made by a processor such as that described with respect to FIG. 6. The received list may be based on a lookup table, such as the table described with respect to FIG. 5. Determinations may be made by either a dispatcher module located at a server where a dispatcher module makes a determination in response to a client request or by a dispatcher module located at (i) a requesting client or (ii) at a second client in response to a client request from a first client.

Next, at 130, in a case that the requested resource is determined to be cached at the first client, a request is sent to the first client for the cached resource. However, if the requested resource is determined to be not cashed at the first client a request is sent to the server for the cached resource. The request may be in a form of a HTML, XML, or internet protocol ("IP") request. The request may be sent (i.e., performed) by a second client to the first client which has cached a resource. In some embodiments, the dispatcher module may determine the source(s) of a cached resource, but connections between clients may be performed by the clients directly. In some embodiments, the request may be sent to a plurality of clients if the dispatcher module determines that the plurality of clients has stored the cached resource and the cached resource can be downloaded in parallel. At 140, the cached resource is received. The cashed resource may be received at from the first client. When a new resource is first received at the requesting client the requesting client may transmit a broadcast message to all known neighbor clients indicating that the resource has been cached by the requesting client.

Figure 2:
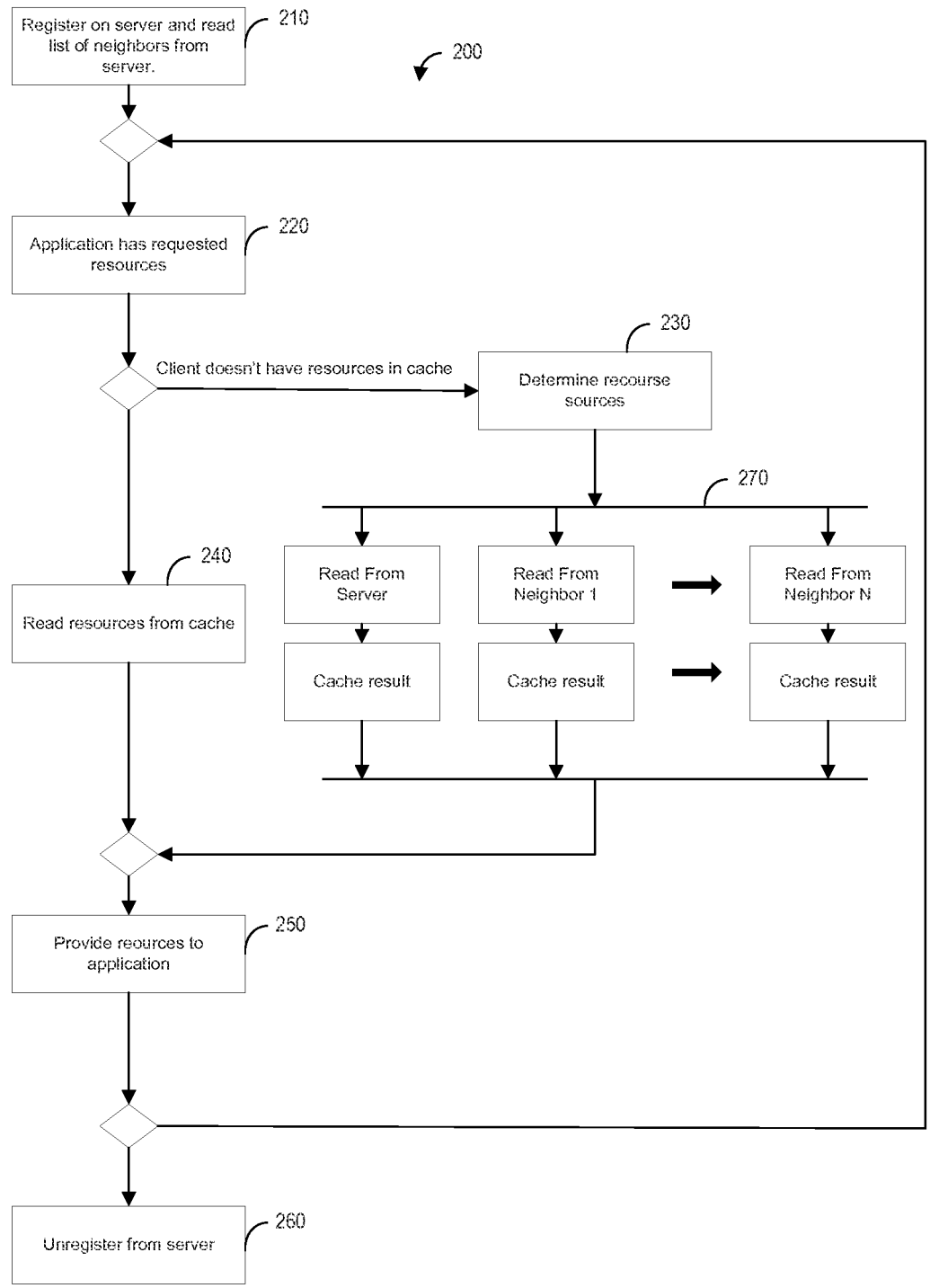
FIG. 2 illustrates a method according to some embodiments.

Referring now to FIG. 2, an embodiment of a method 200 is illustrated. The method 200 may be embodied on a non-transitory computer-readable medium. Furthermore, the method 200 may be performed by a system such as, but not limited to, system 300 of FIG. 3 and FIG. 4. The method 200 may be associated with sharing cached resources between clients.

At 210, a client, or in some embodiments, a dispatcher module, that is requesting a resource may register itself on a server and receive a list of neighboring clients from the server. In some embodiments, the list of neighboring clients may comprise a list of available clients or a list of neighboring clients to indicate to the requesting client which clients may be solicited for the resource. The list may comprise a list of available or neighboring clients that have stored the requested resource. In some embodiments, the list may also include a reliability score associated with each client so that the requestor may be able to choose a most reliable source for its requested resource. In some embodiments, a neighboring client may comprise a client computer on a same network segment.

At 220 a determination is made if a requested resource is already cached at the requesting client. If yes (e.g., the resource is already cached), the resource may be read from the cache at 240. However, if no, a determination may be made, at 230, as to which sources on a network have cached the requested resource. The determination may be made by a processor such as that described with respect to FIG. 6. Furthermore, the determination may be made based on a lookup table, such as the table described with respect to FIG. 5 by a dispatcher module.

The requesting client (or its associated dispatcher module) may select a best source or sources to retrieve the requested resource. To select a best data source, the dispatcher, using heuristic analysis (e.g., analyzing response time, request history, a number of sources, etc.), may determine a best data source and the requesting client may select the best data source from a list of sources. If none of the available neighbor clients have cached a requested resource, a request for the resource may be sent to the server. In some embodiments, if multiple neighbors comprise a same resource, the resource may be requested from the multiple neighbors simultaneously and the requested resource may be received in parallel. Receiving a response in parallel may improve retrieval time of obtaining a resource. Furthermore, in some embodiments, if multiple resources are requested at once, then each resource of the multiple resources may be received from its own best source. As illustrated in FIG. 2, multiple sources may be selected at 270.

Determinations may be made by a dispatcher module that is located either (i) at the server where the dispatcher module makes a determination in response to a client request or (ii) by a dispatcher module that is located at a requesting client (or in some embodiments, at a second client) in response to a client request from a first client. In one embodiment, when determining a source for retrieval of a requested resource, the dispatcher module may prioritize resource requests based on a cost of each request.

Client requests may be categorized, such as, for example, cheap requests, or expensive requests where a cheap request would a request that is faster and requires less resources (e.g., less software and hardware resource) than other kinds of requests.

Request from a first client to a second client may be considered as cheap requests since these requests may not create a bottleneck at the server or on the server's network segment and do not utilize server resources (e.g., processor or I/O). Furthermore, these kinds of requests may have a short network path to traverse since clients are typically neighbors located on a same hub/switch/sub-network (e.g., may be in a same room or building). Moreover, if several clients have cached a desired resource, a requesting client may be able to receive that resource in parallel (e.g., reading same resource from more than one source at a same time or by loading different parts of a same resource from different sources). Also, in a case that a client has requested multiple resources, each resource may be received from a separate source (e.g., client).

Expensive requests may be considered requests between a client and a server. Requests may be considered expensive if the request must traverse a significant distance to reach the server such as, but not limited to, a sub-network, which may consume resources, create potential bottlenecks, and limit parallelizing a response to a client's request.

When a client requests the location of a resource from a server, this type of request may be more expensive than when a neighboring client is a dispatcher but this kind of request may be less expensive than requesting the data directly from the server since only a small data amount is sent and there is no transmission of the requested resource. For this kind of request, the server may simply redirect resource requests to a neighbor of the requesting client which has already downloaded requested resource. Using a server as a dispatcher may require less logic on client side, but does not eliminate traffic sent to the server network segment.

When a server acts as the dispatcher, the server may store information associated with clients and which resources have been received by each particular client. The information may be stored in a form of a database, a table, a list, a linked list, or an array. With a server acting as a dispatcher, a requesting client may send a request to the server and in response to the request, receive a list of clients and their associated resources. Thus, the server may comprise a module that tracks which clients have connected to the server, which resources were received by each client, and an expiry date (e.g., date of expiration) for each resource. The server may track not only active clients, but also locations of resources. Thus, a server may be able to select itself as a source or may select a client that is a neighbor to the requesting client as a source.

When a client or clients are used as dispatcher, a dispatcher module may be responsible for redirection of data requests to neighboring clients or to a server that stores the requested resource. The dispatcher module may connect the clients, but is not responsible for data delivery itself. For example, in a case where a second client acts as dispatcher, data from a third client, will not come initially to the second client and then to first client, instead the data will travel directly from the third client to the first client. However, in some embodiments, if a dispatcher module were to store cached resources, the dispatcher module client (e.g., the second client in this example) can increase performance by paralleling a next request for a same resource. When a client comprises a dispatcher module, the dispatcher module requires only a list of available neighbor clients from the server to be able to redirect clients to requested resources. Resources are provided to the requesting client at 250. If more resources are requested, the method may loop back to 220. Otherwise, in some embodiments the requesting client (or its associated dispatcher module) may unregister itself from the server at 260.

Figure 3:
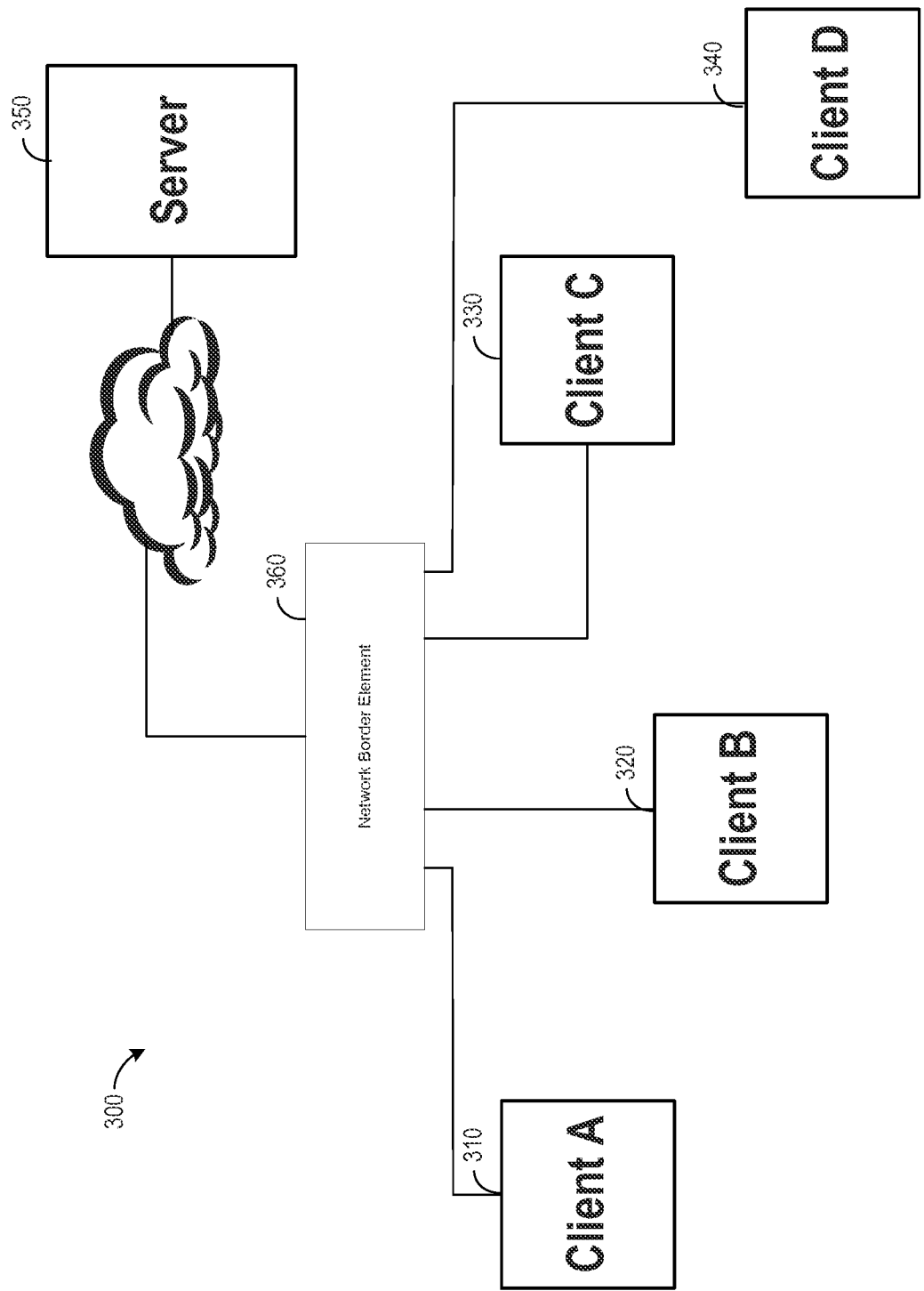
FIG. 3 illustrates a system according to some embodiments.
Figure 4:
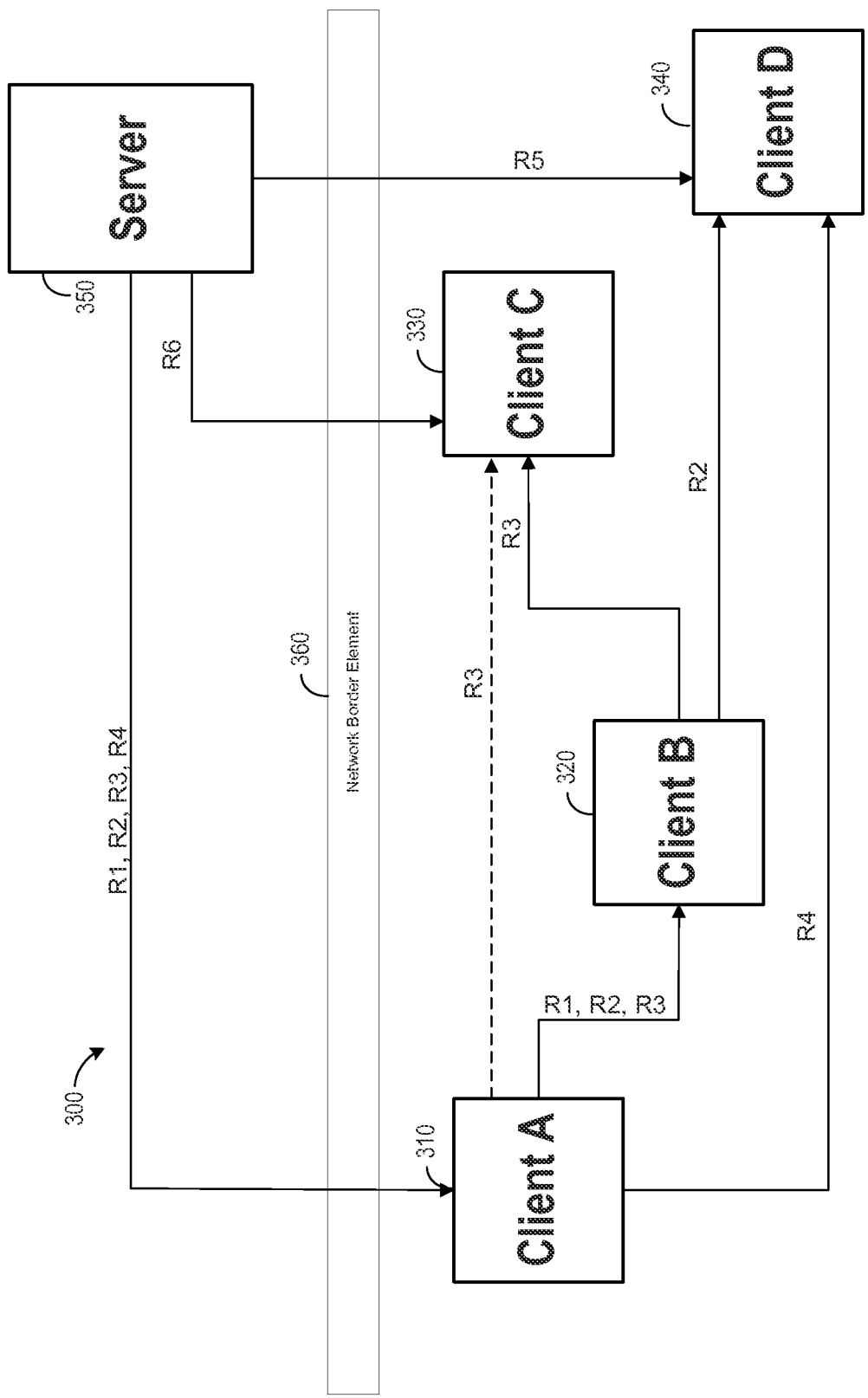
FIG. 4 illustrates a system according to some embodiments.

Referring now to FIGS. 3 and 4, embodiments of system 400 are illustrated. In some embodiments, FIG. 3 may illustrate an example of a physical connection of the system 300 while FIG. 4 may illustrate an example of a logical flow of resources in system 300.

As illustrated in FIG. 3, a plurality of clients (e.g., Client A 310, Client B 320, Client C 330, and Client D 340) are in communication with a network border element 360. Each of plurality of clients 310/320/330/340 may comprise, but are not limited to, a desktop computer, a laptop computer, a tablet, a smart phone, or any other non-server device. The network border element 360 may comprise an element that separates a network or network segment from other networks or network segments, such as, but not limited to a router, a network switch, and/or gateway. The network border element 360 is in communication with a first network segment that comprises each of plurality of clients 310/320/ 330/340 and a second network segment that communicates with a server 350. As illustrated, the network border element 360 may not be directly connected to the server 350 and may communicate with the server 350 via a local area network/ wide area network/metropolitan area network or other cloud computing architecture as known in the art.

For illustrative purposes, and to aid in understanding features of the specification, an example will be introduced. This example is not intended to limit the scope of the claims. In this example, and referring to FIG. 4, Client A 310 may request resources R1, R2, R3 and R4. In this example, each client may comprise a dispatcher module and Client A 310 may determine that no other client has cached R1, R2, R3 and R4. After receiving and caching copies of R1, R2, R3 and R4 from server 350, Client A 310 may transmit to each of its neighboring clients that it has now cached R1, R2, R3 and R4. Next, Client B 320 may request resources R1, R2 and R3. Since, Client B 320, received the indication that Client A 310 contains these resources, Client B 320 may retrieve these resources form Client A 310. Client B 320 now transmits to each its neighbors that it has cached R1, R2, and R3.

Client C 330, now requests resources R3 and R6. Client C 330 may retrieve R3 from Client B 320 (as illustrated) or may retrieve R3 from Client A 310 and Client B 320 in parallel since both have cached resource R3 (as illustrated by the dashed line). However, since no clients have caches resource R6, a request is sent to the server 350 to retrieve resource R6. Client C 330 then transmits to its neighbors that it has cached resources R3 and R6. Finally in this example, Client D 340 requires recourses R2, R4 and R5. Based on the information that Client D 340 has received from its neighbor clients, Client D 340 retrieves R2 from Client B 320, R4 from Client A 310 and sends a request to the server 350 for resource R5.

Requests from Client B 320 to Client A 310, may be considered cheap requests since these requests may not create a bottleneck at the server or on the server's network segment. Requests from Client A 310 to server 350 may be considered expensive since these request must traverse a significant distance to reach the server.

Figure 5:
FIG. 5 illustrates a portion of a table according to some embodiments.

Now referring to FIG. 5, an embodiment of a cache resource table 500 is illustrated. Each client, or dispatcher module, may store a list or table 500 (which may be a portion of a database) that stores a client ID 502 (e.g., a unique identifier for a client on a network), available cached resources 504, and an expiration time 506 of the resource (e.g. a maximum allowable time before a resource expires) .While resources are illustrated, for simplicity, having a common expiration time, each resource may have its own expiration time and corresponding expiration time entry in the cache resource table 500.

Each client or dispatcher module may keep a list of resources that lists each resource and the client IDs that have cached the resource. In one embodiment the list may be created by periodically querying the server to determine which clients are connected to a same network segment. Alternatively, the server may push this list of resources each time the server updates its list or in response to a client requesting a resource. In another embodiment, each client may periodically query (e.g., send out a broadcast request) its neighbor clients for a list of resources that are cached at that neighboring client. Furthermore, if a client does not respond to a request for resources, the non-responding client may be dropped from the list. To optimize the request for determination of resource sources, clients can use push or transmit an indication of the resource that was just cached using a broadcast message about new resource availability, after downloading the resource from the server.

In some embodiments, resources may be public (e.g., shared) or private (e.g. limited to an individual client or a limited group of clients). A server may mark a resource as public or private based on an expiration date (short expiration dates for private resources) or a client may not place a private resource in cache.

If a private resource is cached and has not expired, it may be transmitted to a neighbor client if the private resource is requested. The logic to transmit private resources may be optimized by explicitly marking a private resource response or by providing a group marker that indicates which members of a group (e.g., which neighboring clients) can access a resource. Addition optimization may be performed by eliminating neighbor request for data types that cannot be cached or caching only specific data types.

Thus, private resources can be shared in some cases, if for example neighbor clients send requests for a resources using acceptable credentials (e.g., from an allowed user).

One possible usage scenarios may comprise peer-to-peer (p2p) client caching for Multipurpose Internet Mail Extensions ("MIME") repository of the (Advanced Business Application Programming ("ABAP") Application Server (WebAS). A significant portion of resources in a MIME repository may be public and so this data may be cached and shared by clients.

Figure 6:
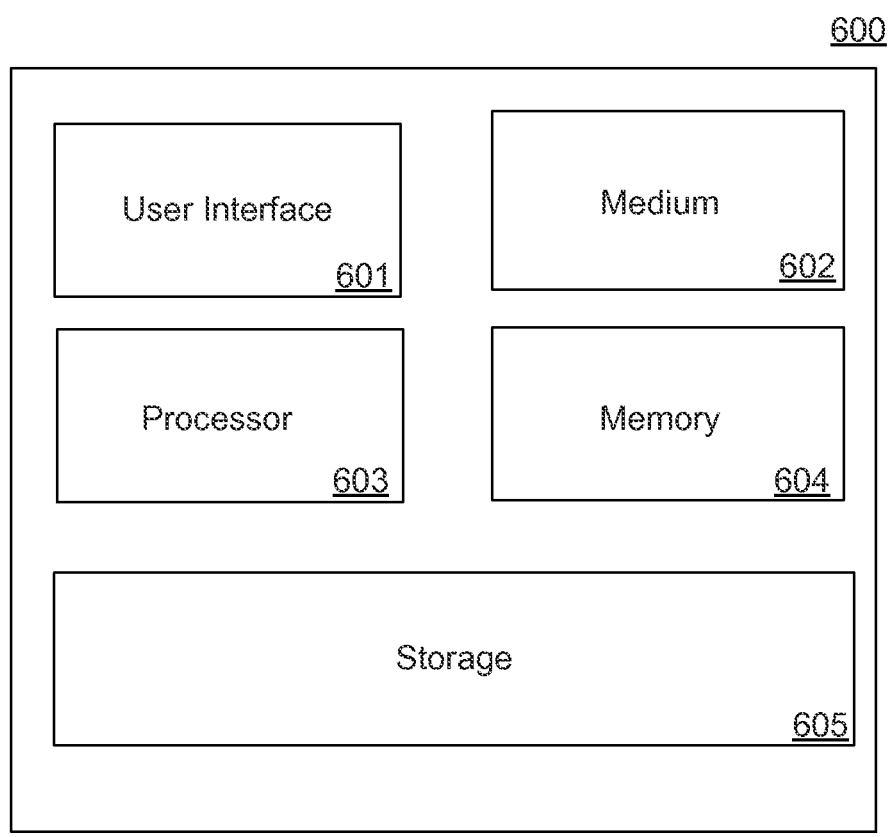
FIG. 6 illustrates an apparatus according to some embodiments.

Now referring to FIG. 6, an embodiment of an apparatus 600 is illustrated. According to some embodiments, the apparatus 600 may relate to a client that comprises a dispatcher module. The apparatus 600 may comprise a user interface 601, a medium 602, a processor 603, a main memory 604, and a storage device 605. According to some embodiments, the apparatus 600 may further comprise a digital display port, such as a port adapted to be coupled to a digital computer monitor, television, portable display screen, or the like.

The user interface 601 may allow users to interact with the apparatus 600 using text commands or with images/graphical icons. In some embodiments, the user interface may comprise a keyboard, mouse, or associated port related thereto. Furthermore, the user interface 601 may comprise a display or a touch screen.

The medium 602 may comprise any computer-readable medium that may store processor-executable instructions to be executed by the processor 603. For example, the medium 602 may comprise a non-transitory tangible medium such as, but is not limited to, a compact disk, a digital video disk, flash memory, optical storage, random access memory, read only memory, or magnetic media.

A program may be stored in a compressed, uncompiled and/or encrypted format. The program may furthermore include other program elements, such as an operating system, a database management system, and/or device drivers used by the processor 603 to interface with peripheral devices.

The processor 603 may include or otherwise be associated with dedicated registers, stacks, queues, etc. that are used to execute program code and/or one or more of these elements may be shared there between. In some embodiments, the processor 603 may comprise an integrated circuit. In some embodiments, the processor 603 may comprise circuitry to perform a method such as, but not limited to, the method described with respect to FIG. 1 or FIG. 2.

The processor 603 communicates with the storage device 605. The storage device 605 may comprise any appropriate information storage device, including combinations of magnetic storage devices (e.g., a hard disk drive), optical storage devices, flash drives, and/or semiconductor memory devices. The storage device 605 stores a program for controlling the processor 603. The processor 603 performs instructions of the program, and thereby operates in accordance with any of the embodiments described herein. For example, the processor 603 may determine a client that comprises a cached resource.

The main memory 604 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 604 may comprise a plurality of memory modules.

As used herein, information may be "received" by or "transmitted" to, for example: (i) the apparatus 600 from another device; or (ii) a software application or module within the apparatus 600 from another software application, module, or any other source.

In some embodiments, the storage device 605 stores a database (e.g., including information associated with cached resources). Note that the database described herein is only an example, and additional and/or different information may be stored therein. Moreover, various databases might be split or combined in accordance with any of the embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
receiving a list that indicates (i) neighboring clients, (ii) a respective reliability score associated with each of the neighboring clients and (iii) cached resources and their associated locations;
determining, via a processor, a data source to retrieve a cached resource based on the list and a reliability score of the data source;
in a case that the data source is determined to be a first neighboring client on a same segment as a requestor of the cached resource, (i) sending a request to the first neighboring client for the cached resource, wherein the first neighboring client is a non-server and (ii) receiving the cached resource from the first neighboring client; and
in a case that the data source is not located on the same segment as the requestor, (i) sending a request to a server for the cached resource, (ii) in response to the server receiving the request, receiving an update to the list and the cached resource from the server and (iii) transmitting an indication to the neighboring clients that the cached resource is stored at the requestor.

2. The method of claim 1, further comprising:
in a case that multiple data sources on the same segment are determined to comprise the cached resource, sending a request to the multiple data sources for the requested resource; and
receiving the cached resource from both the first client and the second client in parallel and at a same time.

3. The method of claim 1, wherein the reliability is based on a response time of the data source.

4. The method of claim 1, wherein the reliability is based on a response time of the data source and a request history.

5. The method of claim 1, wherein the-non-server comprises a computing device having a function of interfacing with end users and running client software and does not have a main function of being accessed by other clients.

6. The method of claim 1, further comprising:
receiving the cached resource from a second client in parallel with the first client.

7. The method of claim 1, further comprising:
receiving a second cached resource from a second client.

8. A non-transitory computer-readable medium comprising instructions that when executed by a processor perform a method, the method comprising:
receiving a list that indicates (i) neighboring clients, (ii) a respective reliability score associated with each of the neighboring clients and (iii) cached resources and their associated locations;
determining, via a processor, a data source to retrieve a cached resource based on the list and a reliability score of the data source;
in a case that the data source is determined to be a first neighboring client on a same segment as a requestor of the cached resource, (i) sending a request to the first neighboring client for the cached resource, wherein the first neighboring client is a non-server and (ii) in response to the server receiving the request, receiving an update to the list and the cached resource from the first neighboring client; and
in a case that the data source is not located on the same segment as the requestor, (i) sending a request to a server for the cached resource, (ii) receiving the cached resource from the server and (iii) transmitting an indication to the neighboring clients that the cached resource is stored at the requestor.

9. The medium of claim 8, further comprising:
in a case that multiple data sources on the same segment are determined to comprise the cached resource, sending a request to the multiple data sources for the requested resource; and
receiving the cached resource from both the first client and the second client in parallel and at a same time.

10. The medium of claim 8, wherein the reliability is based on a response time of the data source.

11. The medium of claim 8, wherein the reliability is based on a response time of the data source and a request history.

12. The medium of claim 8, wherein the non-server comprises a computing device having a function of interfacing with end users and running client software and does not have a main function of being accessed by other clients.

13. The medium of claim 8, further comprising:
receiving the cached resource from a second client in parallel with the first client.

14. The medium of claim 8, further comprising:
receiving a second cached resource from a second client.

15. An apparatus comprising:
a processor;
a non-transitory computer-readable medium comprising instructions that when executed by the processor perform a method, the method comprising:
receiving a list that indicates (i) neighboring clients, (ii) a respective reliability score associated with each of the neighboring clients and (iii) cached resources and their associated locations;
determining , via the processor, a data source to retrieve a cached resource based on the list and a reliability score of the data source;
in a case that the data source is determined to be a first neighboring client on a same segment as a requestor of the cached resource, (i) sending a request to the first neighboring client for the cached resource, wherein the first neighboring client is a non-server and (ii) in response to the server receiving the request, receiving an update to the list and the cached resource from the first neighboring client; and
in a case that the data source is not located on the same segment as the requestor, (i) sending a request to a server for the cached resource, (ii) receiving the cached resource from the server and (iii) transmitting an indication to the neighboring clients that the cached resource is stored at the requestor.

16. The apparatus of claim 15, further comprising:
in a case that multiple data sources on the same segment are determined to comprise the cached resource, sending a request to the multiple data sources for the requested resource; and
receiving the cached resource from both the first client and the second client in parallel and at a same time.

17. The apparatus of claim 15, wherein the reliability is based on a response time of the data source.

18. The apparatus of claim 15, wherein the reliability is based on a response time of the data source and a request history.

19. The apparatus of claim 15, wherein the non-server comprises a computing device having a function of interfacing with end users and running client software and does not have a main function of being accessed by other clients.

20. The apparatus of claim 15, further comprising:
receiving the cached resource from a second client in parallel with the first client.

* * * * *